(12) United States Patent
Wiemker et al.

(10) Patent No.: US 10,380,735 B2
(45) Date of Patent: Aug. 13, 2019

(54) IMAGE DATA SEGMENTATION

(75) Inventors: Rafael Wiemker, Kisdorf (DE);
Thomas Buelow, Grosshansdorf (DE);
Daniel Bystrov, Hamburg (DE);
Torbjoern Vik, Hamburg (DE);
Heinrich Schulz, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 260 days.

(21) Appl. No.: 13/637,674

(22) PCT Filed: Mar. 16, 2011

(86) PCT No.: PCT/IB2011/051106
§ 371 (c)(1),
(2), (4) Date: Sep. 27, 2012

(87) PCT Pub. No.: WO2011/128791
PCT Pub. Date: Oct. 20, 2011

(65) Prior Publication Data
US 2013/0021372 A1    Jan. 24, 2013

Related U.S. Application Data

(60) Provisional application No. 61/324,801, filed on Apr. 16, 2010.

(51) Int. Cl.
G06T 7/00 (2017.01)
G06T 7/12 (2017.01)

(52) U.S. Cl.
CPC .............. G06T 7/0012 (2013.01); G06T 7/12 (2017.01); *G06T 2207/10072* (2013.01);
(Continued)

(58) Field of Classification Search
None
See application file for complete search history.

(56) References Cited

U.S. PATENT DOCUMENTS 7,063,532 B1 *  6/2006  Jones ................... A61C 7/00
                                                    433/213
7,739,623 B2 *  6/2010  Liang et al. ............... 715/848
(Continued)

FOREIGN PATENT DOCUMENTS

GB    2463141 A    3/2010
JP    2000163599 A    6/2000
(Continued)

OTHER PUBLICATIONS

David Leggett, "Working with Layers in Photoshop", 20080419, "Photoshop Tutorials".*

(Continued)

*Primary Examiner* — YuJang Tswei
(74) *Attorney, Agent, or Firm* — Larry Liberchuk

(57) ABSTRACT

A method for segmenting image data includes identifying a 2D boundary start position corresponding to tissue of interest in a cross-section of volumetric image data, wherein the start position is identified by a current position of a graphical pointer with respect to the cross-section, generating a preview 2D boundary for the tissue of interest based on the start position, displaying the preview 2D boundary superimposed over the cross-section, and updating the displayed preview 2D boundary if the position of the graphical pointer changes with respect to the cross-section.

19 Claims, 5 Drawing Sheets

(52) U.S. Cl.
CPC ............... *G06T 2207/20101* (2013.01); *G06T 2207/20104* (2013.01); *G06T 2207/30004* (2013.01)

(56) References Cited

U.S. PATENT DOCUMENTS

| | | | |
|---|---|---|---|
| 8,160,320 B2 | 4/2012 | Li | |
| 2002/0172407 A1* | 11/2002 | O'Donnell | G06T 7/0083 382/131 |
| 2003/0152262 A1 | 8/2003 | Mao et al. | |
| 2004/0205514 A1* | 10/2004 | Sommerer et al. | 715/501.1 |
| 2005/0018902 A1 | 1/2005 | Liang | |
| 2005/0231530 A1 | 10/2005 | Liang et al. | |
| 2007/0100226 A1* | 5/2007 | Yankelevitz | A61B 5/1075 600/407 |
| 2008/0193006 A1* | 8/2008 | Udupa et al. | 382/131 |
| 2008/0260221 A1 | 10/2008 | Unal et al. | |
| 2008/0317351 A1 | 12/2008 | Fenchel et al. | |
| 2009/0097749 A1 | 4/2009 | Busch | |

FOREIGN PATENT DOCUMENTS

| | | |
|---|---|---|
| WO | 2007107907 A2 | 9/2007 |
| WO | 2008149274 A1 | 12/2008 |

OTHER PUBLICATIONS

Filip Malmberg, Erik Vidholm, and Ingela Nystrom, "A 3D Live-Wire Segmentation Method for Volume Images Using Haptic Interaction", 2006, Springer-Verlag Berlin Heidelberg.*

MonsterPararazzi, "Miley and Howie—Summer 2008", 2009, MonsterPaparazzi.*

Jeroen Stinstra, Josh Blauer, Jess Tate, Brett Burton, Ahrash Poursaid, "Seg3DTutorial", 2008, University of Utah.*

D'Souza, N., et al.; ASAP: Interactive quantification of 2D airway geometry; 1996; SPIE; vol. 2709:180-196.

Souza, A., et al.; Interactive Live Wire and Live Snake: New User-steered 3D Image Segmentation Paradigms; 2006; SPIE; vol. 6144:1-7.

Barrett, W. A., et al.; Interactive live-wire boundary extraction; 1997; Medical Image Analysis; 1(4)331-341.

* cited by examiner

IMAGE DATA SEGMENTATION

CROSS REFERENCE TO RELATED APPLICATIONS

This application claims the benefit of U.S. provisional application Ser. No. 61/324,801 filed Apr. 16, 2010, which is incorporated herein by reference.

The following generally relates to segmenting image data and is described with particular application to computed tomography (CT); however, other imaging modalities such as magnetic resonance imaging (MRI), 3D x-ray, positron emission tomography (PET), single photon emission tomography (SPECT), ultrasound (US), and/or other imaging modalities are also contemplated herein.

Imaging has been used to generate volumetric image data representing anatomical structures and tissue of interest in human and animal patients. In one application, the tissue of interest includes a tumor, a vessel, an aneurysm, etc. With respect to a tumor, the image data has been used to identify and/or assess the tumor, including pre and post tumor therapy growth, progression, success, etc. One technique for identifying and/or extracting the image data corresponding to the tumor from the volumetric image data is 3D segmentation. Generally, 3D segmentation involves defining a 2D contour (e.g., via lines, curves, etc.) of the tumor in one or more 2D cross-sections (e.g., axial, coronal and/or sagittal) generated from the volumetric image data and propagating the contour(s) through the volumetric image data.

With one 3D segmentation approach, a segmentation seed point is manually positioned by a user in connection with the image data via mouse-click and the seed is automatically grown to the perimeter of the structure of interest. With another approach, a predefined geometrical object such as a circle, rectangle, etc. is manually positioned and sized by a user, for example, via mouse dragging or mouse wheel, to outline the perimeter of the structure of interest. Once defined, various information such as size, shape, length, etc. of the tissue of interest can be determined. With such 3D segmentation algorithms, it may be difficult for the segmentation application to correctly recognize which structure(s) in the image data is the structure(s) being selected by the user (e.g., large or small, with or without adjacent structures, etc.). As a consequence, one segmentation application requires the user to define a segmentation seed point and a geometric shape that indicates an approximate size of the structure of interest.

Unfortunately, the latter segmentation requires extra steps by the user (i.e., at least two mouse clicks, mouse drags, and/or wheel turns), which may increase segmentation time and is prone to error. Furthermore, although the geometric shape size may provide an indication of the outcome of the final segmentation, the segmentation result is still somewhat a surprise to the user and may depend in a non-linear manner on the geometric shape. Thus, a user may have to repeat the acts of clicking to set a seed point and setting the geometric shape several times before a suitable contour of the tissue of interest is achieved. In view of at least the foregoing, there is an unresolved need for new and non-obvious image data segmenting techniques.

Aspects of the present application address the above-referenced matters and others.

According to one aspect, a method for segmenting image data includes identifying a 2D boundary start position corresponding to tissue of interest in a cross-section of volumetric image data, wherein the start position is identified by a current position of a graphical pointer with respect to the cross-section, generating a preview 2D boundary for the tissue of interest based on the start position, displaying the preview 2D boundary superimposed over the cross-section, and updating the displayed preview 2D boundary if the position of the graphical pointer changes with respect to the cross-section.

According to another aspect, a segmentor includes a processor that determines a real time 2D boundary for tissue of interest in a displayed cross-section of volumetric image data based on a current position of a displayed pointer in connection with the displayed cross-section, wherein the real time 2D boundary changes as the current position of the displayed pointer changes.

According to another aspect, a computer readable storage medium encoded with instructions which, when executed by a computer, cause a processor of the computer to perform the act of: performing a 3D segmentation of tissue of interest in volumetric image data based on a real time preview of a 2D boundary generated based solely on a position of a mouse pointer with respect to the tissue of interest.

The invention may take form in various components and arrangements of components, and in various steps and arrangements of steps. The drawings are only for purposes of illustrating the preferred embodiments and are not to be construed as limiting the invention.

The following generally relates to generating and displaying one or more real-time preview 2D boundaries in real time (boundaries created based on current state information) and using a selected (e.g., via a moue click or otherwise) one of the 2D boundaries for a 3D segmentation of tissue of interest in volumetric image data in three dimensions. This allows for identifying a suitable 2D boundary simply by hovering a mouse or other pointer over the image data and selecting, via a mouse click or otherwise, a 2D boundary upon locating a suitable 2D boundary. A 3D segmentation can then be automatically generated based on the selected 2D boundary.

Figure 1:
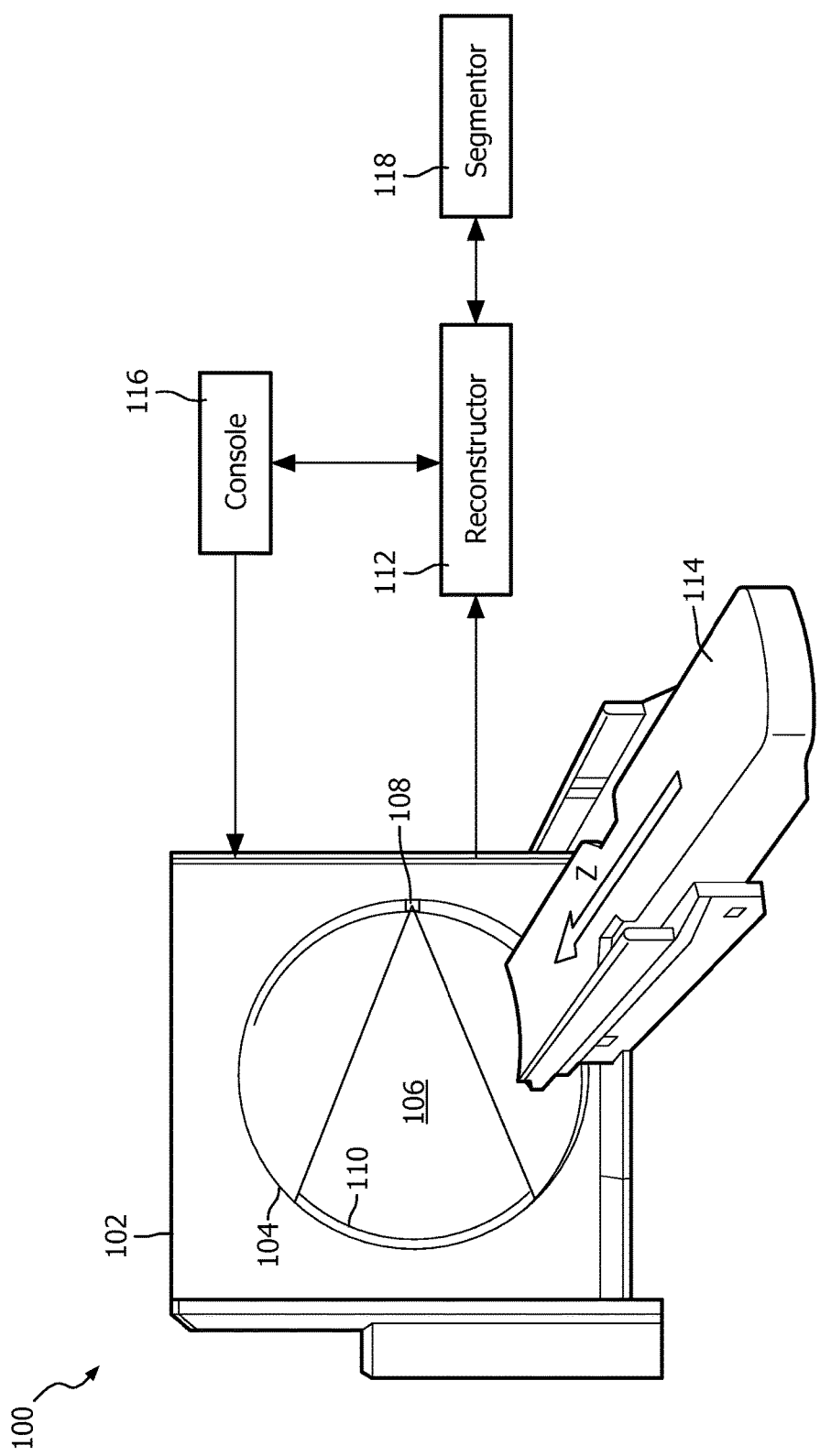
FIG. 1 illustrates an imaging system in connection with an image data segmentor.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 about a longitudinal or z-axis. A radiation source 108, such as an x-ray tube, is supported by the rotating gantry 104 and rotates with the rotating gantry 104, and emits radiation that traverses the examination region 106. A radiation sensitive detector array 110 detects radiation emitted by the radiation source 108 that traverses the examination region 106 and generates projection data indicative of the detected radiation.

A reconstructor 112 reconstructs projection data and generates volumetric image data indicative of the examination region 106. A support 114, such as a couch, supports the object or subject in the examination region 106. The support 114 is movable along the x, y, and z-axis directions. A general purpose computing system serves as an operator console 116, which includes human readable output devices such as a display and/or printer and input devices such as a keyboard and/or mouse. Software resident on the console 116 allows the operator to control the operation of the system 100, for example, by allowing the operator to select a motion compensation protocol, initiate scanning, etc.

A segmentor 118 segments image data, such as image data from the imaging system 100 and/or other apparatus. This includes dynamically determining and presenting one or more candidate or preview two dimensional (2D) boundaries for tissue of interest based on different reference positions for selection and/or using a selected one of such 2D segmentation boundaries to perform a three dimensional (3D) segmentation of the tissue of interest in the volumetric image data.

As described in greater detail below, in one instance, candidate 2D boundaries are dynamically determined and presented live in real-time (e.g., presented as they are determined) based on a current location of user positional indicia such as a mouse cursor in connection with a monitor displaying the image data. The live 2D boundaries track to and change with the reference positions. The 3D segmentation coincides with the selected 2D segmentation candidate.

The following allows a user to pre view and/or steer the segmentation. With a configuration in which a reference seed or geometric shape is instead used to define initial conditions, the segmentation is performed and then presented to the user, and the segmentation may be somewhat of a surprise to the user. As such, several segmentation iterations may need to be performed before an acceptable segmentation result, if any, if reached.

It is to be appreciated that the segmentor 118 may be part of or integrated with a computing device (e.g., a computer) having one or more processors that execute one or more instructions encoded or stored on computer readable storage medium to implement the functions thereof. For example, in one instance, the segmentor 118 is part of the console 116. In yet another instance, the segmentor 118 resides in a computing device remotely located from the imaging apparatus 100 such as a workstation, computer, etc.

Although the above is describe in connection with CT data, it is to be understood that other imaging data such as MRI, radiography, PET, SPECT, US, and/or other imaging data can be reformatted by the segmentor 118. In addition, the segmentor 118 may include a reconstructor that reconstructs projection data and/or can otherwise process projection data.

Figure 2:
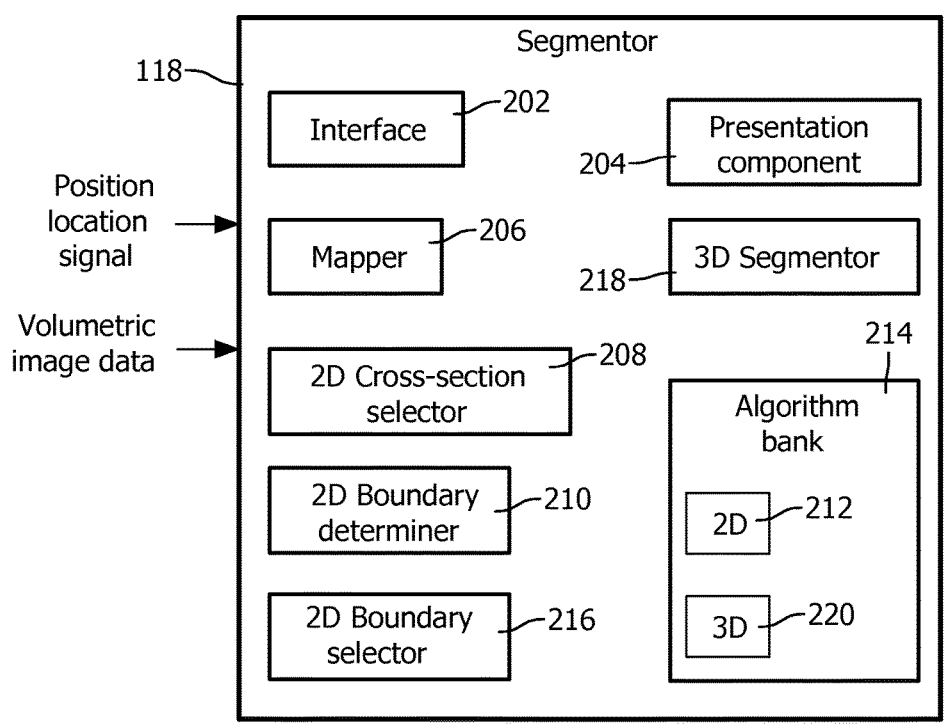
FIG. 2 illustrates an example image data segmentor.

FIG. 2 illustrates an example segmentor 118.

The segmentor 118 includes an interface 202 for receiving data and/or information such a volumetric image data, one or more signals corresponding to user input, and/or other data or information.

A presentation component 204 is configured to present or display (e.g., via a monitor, etc.) one or more of volumetric image data, 2D cross-sections hereof, 2D boundaries, 3D segmentations, 2D boundary statistics, 3D segmentation statistics, a graphical pointer such as a mouse or other pointer and/or other information and/or data.

A mapper 206 maps a position of a displayed graphical pointer to the image data. For example, where the graphical pointer points to a particular region of tissue, such as a perimeter or center of the tissue of interest, the mapper 206 maps the position of the displayed graphical pointer to the particular region of the tissue. As described in greater detail below, the mapping can be used to as a starting point for preview 2D boundary determination for the anatomical structure in the image data corresponding to the tissue.

In one instance, the mapper 206 continuously or periodically (e.g., with a predetermined tracking rate) maps the position. With this instance, the mapped position information always corresponds to a current position of the graphical pointer. Thus, if the graphical pointer is moved, the mapper 206 tracks the movement, mapping the position as the pointer moves. In another instance, a current position can be locked or held so that the mapper 206 does not update the position mapping as the pointer moves.

A 2D cross-section selector 208 selects one or more cross-sections of interest of the volumetric imaged data. A cross section may be in axial, coronal, or sagittal orientation, or in any arbitrary oblique orientation. A cross section may be planar or curvilinear. A cross-section may be selected based on a user input, automatically, and/or otherwise. The cross-section may be selected from displayed volumetric image data and/or displayed cross-sections thereof.

A 2D boundary determiner 210 determines a preview 2D boundary or contour for tissue of interest in the selected cross-section. In one instance, the 2D boundary determiner 210 determines the boundary based on the current position of the graphical pointer in a 2D slice, for example, as determined by the mapper 206. The 2D boundary determiner 210 may use the current position as a starting or other point for determining the 2D boundary, as described in greater detail below.

The foregoing allows a user to move or hover the graphical pointer displayed via the presentation component 204 to various locations of the presented image data corresponding to particular tissue, where a 2D boundary preview for the tissue is graphically presented for the current pointer position. In one instance, the displayed 2D boundary tracks to and/or changes substantially concurrently with the displayed position of the pointer. A user can move the graphical pointer until a desired or satisfactory boundary (e.g., a contour deemed satisfactory to the user) is presented and then select the desired boundary. The 2D boundary determiner 210 may employ a 2D boundary algorithm (2D) 212 from an algorithm bank 214 and/or other algorithm A 2D boundary selector 216 is used to select a previewed 2D boundary. A 2D boundary can be selected via a mouse pointer click or other selection input provided by a user. In one instance, once a 2D boundary is selected, the pointer can be moved around without invoking creation of 2D boundaries based on the current pointer position. In another instance, the selected 2D boundary can be held (and displayed) as other 2D boundaries are preview in connection with the current position of a pointer. A selected 2D boundary can be de-selected and/or modified.

Figure 3:
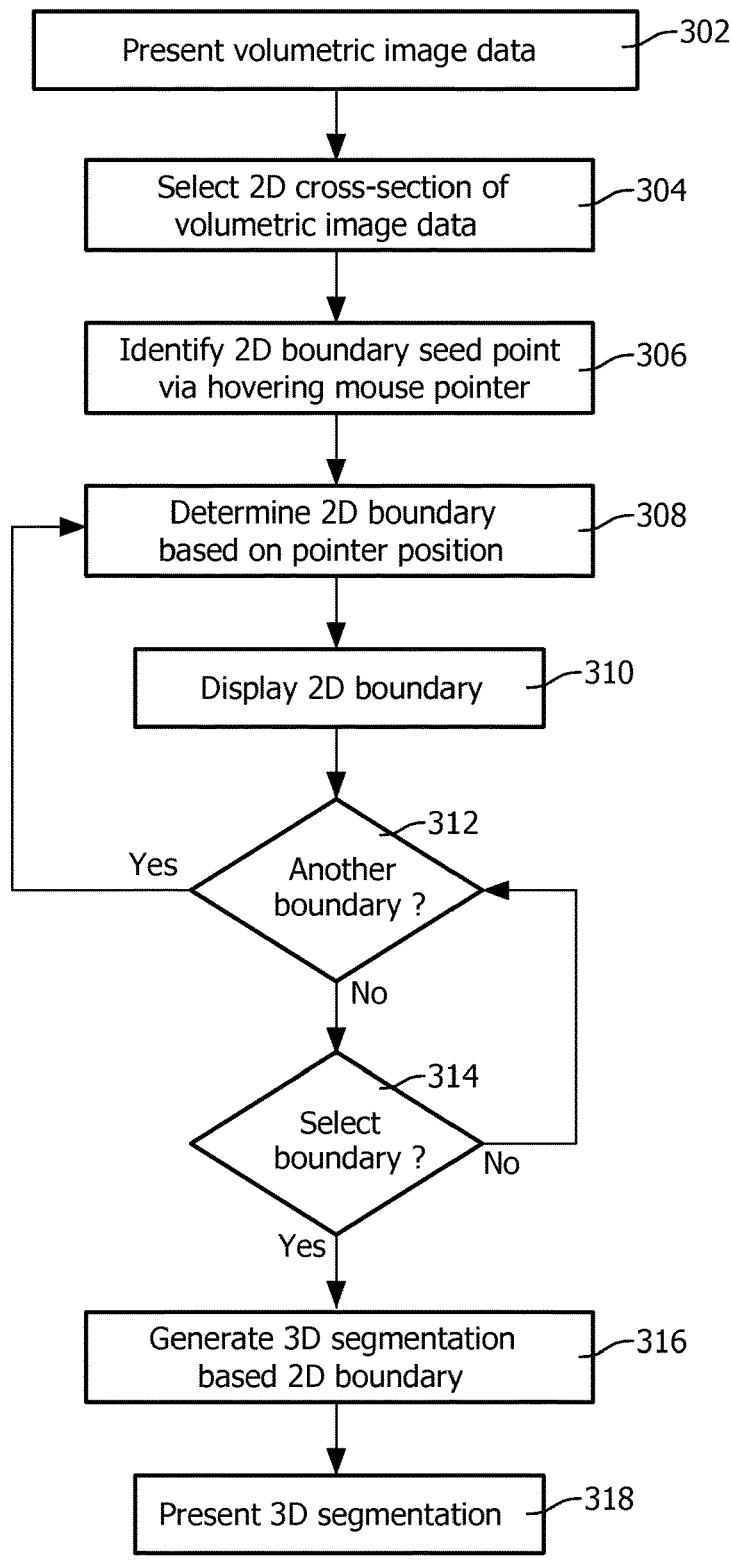
FIG. 3 illustrates an example method for segmenting volumetric image data.

A 3D segmentor 218 segments the volumetric data based on the selected 2D boundary. In one instance, this includes propagating the 2D boundary through the volumetric image with respect to the tissue of interest. In another instance, 2D boundaries are determined for multiple different slices (e.g., two or more, including all), and more than one 2D boundary is through the volumetric image data. The 3D segmentor 218 may employ a 3D segmentation algorithm (3D) 220 from the algorithm bank 214 and/or other algorithm FIG. 3 illustrates a method for segmenting tissue of interest in three dimensions in volumetric image data.

At 302, volumetric (3D) image data is displayed. As described herein, suitable image data includes, but is not limited to, data generated by one or more of a CT, MRI, radiography, PET, SPECT, US, etc. imaging modality.

At 304, a 2D cross-section of interest from the volumetric image data is selected. The 2D cross-section is displayed in an axial, coronal, sagittal, or oblique view or format. In another embodiment, the 2D cross-section is concurrently displayed in two or more of an axial, coronal, sagittal, or oblique views or formats.

At 306, a reference region of interest (or boundary seed or point) is identified in connection with the displayed 2D cross section. As described herein, in one instance the reference region of interest is identified via a mouse pointer or other graphical pointer. For example, the reference region of interest can be defined as the region under or pointed to by the mouse pointer.

At 308, a 2D boundary is determined for the tissue of interest based on the current reference region of interest. The reference region of interest used to determine the 2D boundary changes as the position of the mouse changes with respect to the image data, for example, by a user selectively hovering the mouse pointer over the image data.

At 310, a preview 2D boundary is displayed in connection with the displayed 2D cross-section. For the example, the 2D boundary may be superimposed or overlayed over the 2D cross-section in connection with the tissue of interest.

At 312, if another reference region of interest is identified, then acts 308 and 310 are repeated for the new reference region of interest. Another reference region can be selected by moving or hovering the pointer over a different location of the 2D image data.

It is to be appreciated that boundary determination (act 308) may be fast enough to allow display (act 310) thereof in near real-time (live segmentation). For example, as the user moves the mouse pointer, 2D boundaries are computed and displayed such that to the user is appears that boundaries are being displayed nearly simultaneously with the positioning of the mouse pointer. Furthermore, one or more statistics for the 2D boundary may be determined and displayed.

At 314, if a 2D boundary is not selected, then act 312 is repeated.

If a 2D boundary is selected (e.g., via mouse click or otherwise), then at 316, the tissue of interest is segmented in the 3D volumetric image data based on the 2D boundary. A selected 2D boundary can be unselected and/or changed.

At 318, the 3D segmentation is displayed in connection with the volumetric image data. One or more statistics for the 3D segmentation may also be displayed.

Figure 4:
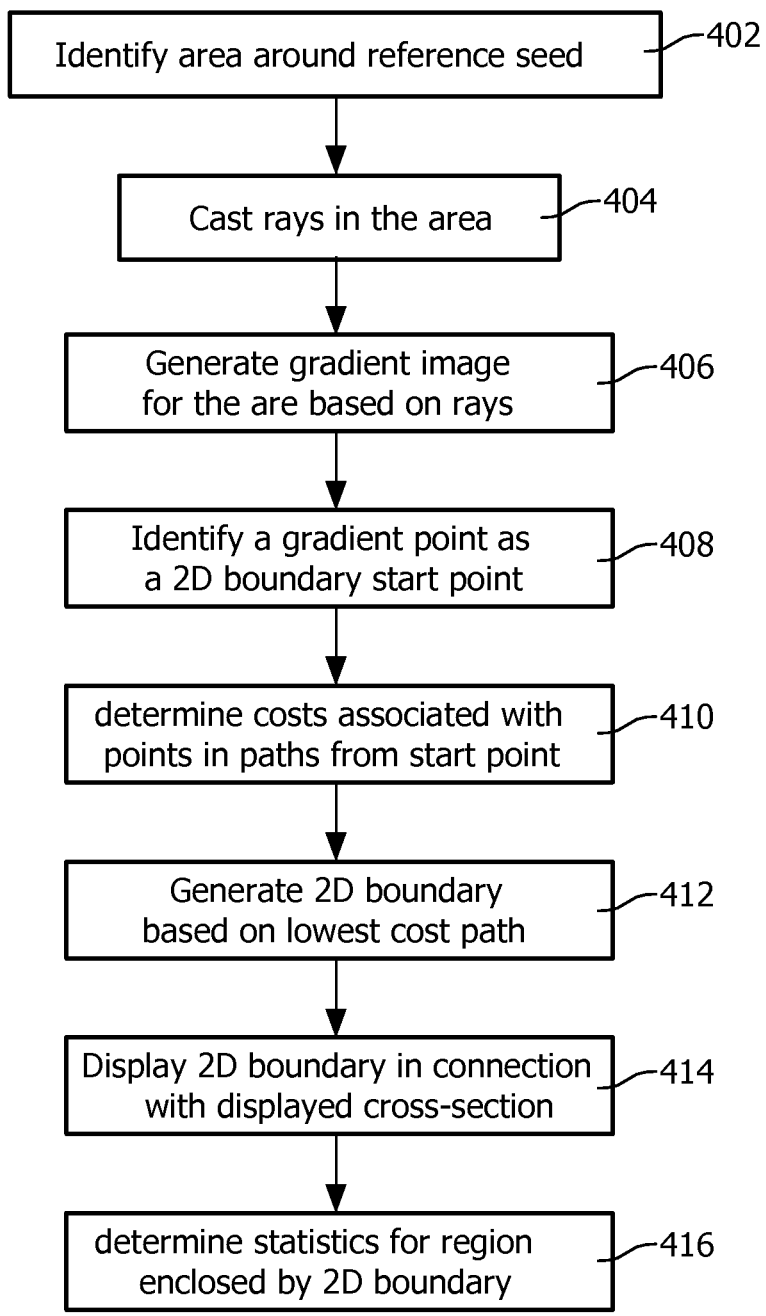
FIG. 4 illustrates an example method for determining a 2D boundary for a 3D segmentation.

FIG. 4 illustrates an example method for determining the 2D boundary in connection with act 310 of FIG. 3.

Various parameters may affect the 2D boundary. Such parameters include, but are not limited to, one or more of a 2D boundary diameter range, a Hounsfield unit (HU) range at a gradient, a HU inside solution area, a gradient direction, weights such as weights for inward and/or outward gradient direction, a smoothness of area, and/or other parameters.

At 402, an area around the reference (seed) region of interest is identified. The area may be based on the 2D boundary diameter range and/or other parameter. The data corresponding to the area is re-sampled or formatted to a polar or cylindrical coordinate system ($\varphi$, $\rho$), if not already in such a coordinate system. Alternatively, the data may remain in or be transformed into a Cartesian (x, y, and z) or other coordinate system.

At 404, rays are cast radially outward from the reference region of interest through the area. The rays may or may not be equally angularly spaced apart.

At 406, a gradient image is generated for one or more predetermined radial steps (e.g., ½ pixel size) in connection with the area. In one embodiment, the gradient is computed as a radial derivative in only a single direction, for example, towards a target. Optionally, a smoothing algorithm can be applied to the gradient image before a shortest path is determined therefrom. Optionally, a weight (e.g., intensity based, direction based, distance to seed based, etc.) can be applied to the gradient.

By way of example, a first weight (e.g., one (1)) may be applied if the image gray-value at that reference region equals a predetermined HU density and a second weight (e.g., less then one (1) such as zero (0)) may be applied if not. In another example, for a gradient with a direction opposite of an expected direction, the gradient magnitude may be reduced, for example, by fifty percent or otherwise. In another example, the weight decreases with distance from the reference region.

At 408, a gradient point from the gradient image is identified as a boundary start point (P1=($\varphi$, $\rho$)). In one instance, the start point is selected as the gradient point having the strongest gradient. Additionally or alternatively, the start point may be selected based on a weighting, such as a weighting based on a distance relative to the reference region and/or a normalization. In another instance, the start point may be otherwise determined. Additionally or alternatively, more than one start point is identified. In this instance, boundaries can be determined for more than one start point.

At 410, costs associated with points (e.g., 36, 72, 108, etc.) between the start point and a target or end point (P2=($\varphi$+2$\pi$, $\rho$)) are determined based on the gradient image. In one instance, beginning with a point p, for one or more of the neighbors (e.g., from the eight 2D-neighbors or a subset thereof) a path cost C(p') is determined as current cost C(p)+Euclidean dist D(|p−p'|) between the current point p and the neighbor p' multiplied by local cost function of this neighbor: C(p')=C(p)+D(|p−p'|)*Max(1, MaxCost−localCost(p')). The costs are stored in memory, e.g., in a cost map or the like. The cost may lower along high gradient lines or other cost function.

The spacing between the points may or may not be the same. Additional points can be generated via interpolation (e.g., trilinear, spline, nearest neighbor, etc.), extrapolation, and/or otherwise. With cylindrical coordinates, the areas with a flat cost function (i.e., no gradient) will automatically form circle arcs for generally graceful degradation. The cost path can additionally or alternatively be determined in Cartesian or other coordinates. In another instance, a local entropy can be used as a negative term in the cost function. This may improve areas of poor defined gradient. Higher local entropy would correspond to an undirected gradient and avoids cutting through smooth areas with low entropy.

At 412, the 2D boundary is generated based a lowest cost path. In one instance, the boundary is traced from the end point back to the start point based on lowest cost points. In another instance, the 2D boundary is traced from the start point to the end point or otherwise determined In one embodiment, the 2D boundary is highly dependent on the reference region of interest, which allows for a relatively higher degree of steerability and flexibility by the user. In another embodiment, the 2D boundary is highly independent on the reference region of interest, which may facilitate locating a local or global optimum. In another embodiment, the reference region of interest may be provided along with an arbitrary plane (e.g., normal vector) also used to determine the 2D boundary. The coordinates of the 2D boundary are transformed if needed, for example, from cylindrical coordinates to Cartesian coordinates.

At 414, the 2D boundary is displayed, e.g., overlayed or superimposed over the presentation of the cross-section image data. The 2D boundary can be manually modified by the user. For example, the user can change the boundary shape, size, position, etc. The displayed boundary may also be locked so that moving the graphical pointer does not result in visual loss of the superimposed boundary. In another embodiment, a first sub-portion (e.g., the 25% closest to the graphical pointer) of the displayed boundary is locked and a remaining portion of the boundary is free to update until locked.

At 416, optionally, various information is generated based on the 2D boundary and displayed therewith. Examples of suitable information include, but are not limited to, an area of the bounded region, a centroid of the bounded region, a long axis of the bounded region, a short axis of the bounded region, a Hounsfield mean value for the bounded region, a Hounsfield quartile value for the bounded region, minimal oblique bounding box, and/or other information. Some or all of the information can be overlayed or superimposed in connection with the presentation of the cross-section image data. In another example, the information is conveyed via a signal to storage medium and one or more other devices.

Figure 5:
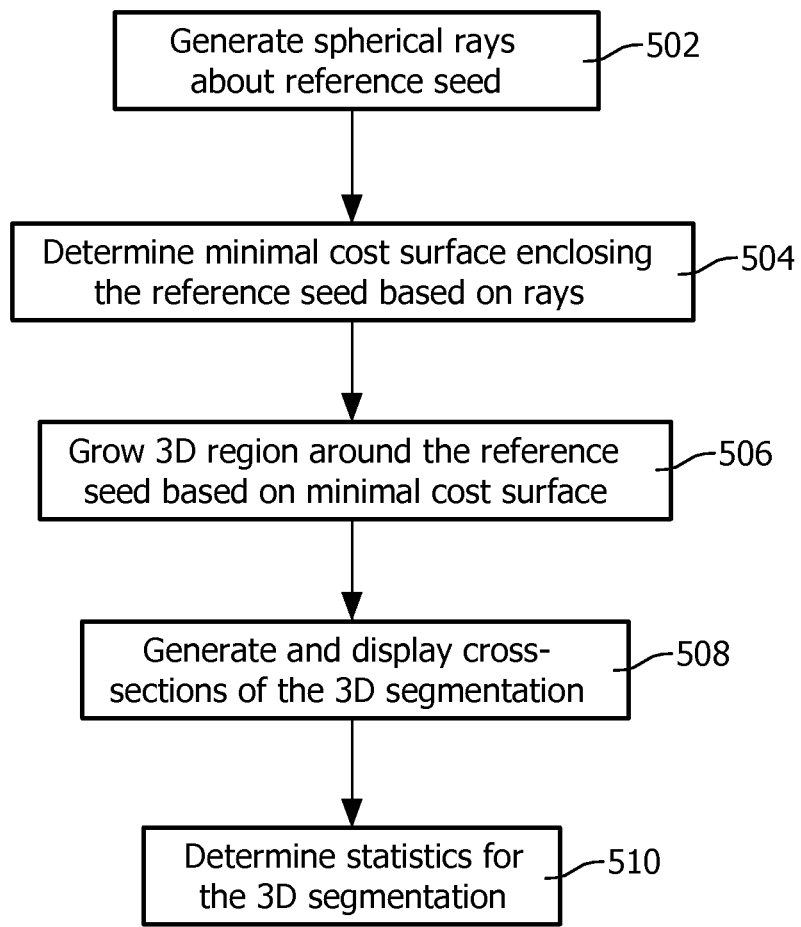
FIG. 5 illustrates an example method for segmenting volumetric image data based on a 2D boundary.

FIG. 5 illustrates an example method for generating a 3D segmentation in connection with act 318 of FIG. 3.

At 502, a plurality of spherical rays with radial gradients around the reference region of interest are generated. The rays may be determined in polar, Cartesian, and/or other coordinates. In the illustrated embodiment, the coordinates of the 2D boundary are converted from Cartesian coordinates to polar coordinates. In another embodiment, the coordinates are converted to another coordinate system. In another embodiment, the coordinates are not converted.

At 504, a surface of minimal cost that encloses the reference region of interest is determined In one instance, this is achieved by growing a surface from the reference region of interest to the boundary, prioritized by a lowest cumulative path cost, using step costs inverse to the image gradient. The reference region of interest is assigned a path cost of zero. Growth is stopped when the boundary is completely filled, a closed hull encloses the reference region of interest, or otherwise. The points are then ordered by highest cost. Points of highest cost are removed if the hull is still closed despite point removal. This mitigates overgrowth of the surface. The remaining points form the hull.

At 506, a region is gown (e.g., in Cartesian coordinates) around the reference region of interest, accepting all points which have polar coordinates inside the enclosing hull.

At 508, axial, coronal, and/or sagittal cross-sections of the 3D segmentation are generated and displayed.

At 510, optionally, various information is generated. Examples of suitable information include, but are not limited to, a volume of the 3D segmentation, the longest axis, the three principal axes of the 3D segmentation, and/or other information. Such information and/or other information can be displayed, for example, concurrently with the 3D segmentation.

The above described acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A method for segmenting image data, comprising:
generating a preview 2D boundary for tissue of interest which contours the tissue of interest from only a single position which is a single point and corresponds to the tissue of interest in a displayed cross-section of volumetric image data and the single position corresponds to a gradient point in a gradient image used to determine the preview 2D boundary, wherein the single position is identified by a current position of a hovering 2D graphical pointer of an input device displayed on a display device with respect to the displayed cross-section without a mouse click;
displaying the generated preview 2D boundary superimposed over the displayed cross-section;
updating the displayed generated preview 2D boundary as the position of the graphical pointer changes with respect to the displayed cross-section; and
in response to an input selecting the displayed generated preview 2D boundary superimposed on the displayed cross-section, segmenting the tissue of interest in the volumetric image data using the selected displayed generated preview 2D boundary.

2. The method of claim 1, wherein the displayed preview 2D boundary which contours the tissue of interest is a real-time, live contour that tracks to the single position of the graphical pointer in the cross-section and encloses the tissue of interest.

3. The method of claim 1, wherein the preview 2D boundary which contours the tissue of interest is updated in real time as the single position of the graphical pointer changes.

4. The method of claim 1, wherein the single position changes only in response to hovering the mouse over a different region of the cross-section.

5. The method of claim 1, further comprising:
selecting the preview 2D boundary via a mouse click.

6. The method of claim 5, further comprising:
employing the selected preview 2D boundary which contours the tissue of interest for a 3D segmentation of the tissue of interest in the volumetric image data.

7. The method of claim 6, wherein the segmented tissue of interest in the volumetric image data encloses the selected preview 2D boundary which contours the tissue of interest.

8. The method of claim 5, further comprising:
locking in the selected 2D preview boundary for segmentation;
generating and displaying a second preview 2D boundary; and
comparing the selected and second preview 2D boundaries.

9. The method of claim 1, further comprising:
determining the preview 2D boundary based on a lowest cost path from the single start point.

10. A segmentor, comprising:
a processor that determines and displays a preview 2D boundary which contours a tissue of interest in a displayed cross-section of volumetric image data from only single point identified by a current position of a displayed mouse hovering over the displayed cross-section without a mouse click and the current position of the displayed mouse is a single point and corresponds to a gradient point in a gradient image used to determine the preview 2D boundary which contours the tissue of interest, wherein the preview 2D boundary which contours the tissue of interest changes as the current position of the displayed mouse of the input device changes, and segments the tissue of interest in the volumetric image data in response to an input selecting a display of the preview 2D boundary which contours the tissue of interest.

11. The segmentor of claim 10, wherein the processor selects the preview 2D boundary from a plurality of displayed preview 2D boundaries corresponding to different positions of the displayed mouse based on a user input.

12. The segmentor of claim 11, wherein the user input includes a mouse click.

13. The segmentor of claim 10, wherein the current position of the displayed mouse changes by hovering the mouse to a different location in the displayed cross-section.

14. The segmentor of claim 13, wherein the preview 2D boundary which contours the tissue of interest changes substantially concurrently with changes in the position of the displayed mouse.

15. The segmentor of claim 10, wherein the processor generates one or more imaging statistics for the segmented volume.

16. The segmentor of claim 10, wherein the processor generates a mapping between the current position of the displayed mouse and the tissue of interest and the processor utilizes the mapping to determine a single start position in the image data for the preview 2D boundary which contours the tissue of interest.

17. The segmentor of claim 10, wherein the processor generates one or more imaging statistics based on a region enclosed and contoured by the preview 2D boundary.

18. The segmentor of claim 10, further comprising:

an interface that receives a user input indicative of the position of a displayed mouse in connection with the displayed cross-section, wherein the preview 2D boundary which contours the tissue of interest changes as the current position of the displayed mouse changes.

19. A non-transitory computer readable storage medium encoded with instructions which, when executed by a processor of a computer, cause the computer to perform the act of:

performing a 3D segmentation of tissue of interest in volumetric image data from a selected previewed 2D boundary which contours and encloses the tissue of interest in a displayed 2D cross-section of the volumetric image data, and the previewed 2D boundary which contours and encloses the tissue of interest is generated based on sole input of a current position of a mouse hovering over the tissue of interest without a mouse click, wherein the current position of mouse is a single point and corresponds to a gradient point in a generated gradient image, and wherein the previewed 2D boundary that contours and encloses the tissue of interest in the displayed 2D cross-section of the volumetric image data is determined using the gradient point in the generated gradient image.

* * * * *